US008779082B2

(12) United States Patent
Qi et al.

(10) Patent No.: US 8,779,082 B2
(45) Date of Patent: Jul. 15, 2014

(54) CATALYST FOR PRODUCING POLYESTER AND METHOD FOR PRODUCING POLYESTER

(75) Inventors: Hua Qi, Jiangsu (CN); Keisuke Honda, Mishima (JP); Kunihiro Morimoto, Mishima (JP); Jun Sakamoto, Mishima (JP); Hiroji Kojima, Mishima (JP)

(73) Assignee: TORAY Industries, Inc., Tokyo (JP)

( * ) Notice: Subject to any disclaimer, the term of this patent is extended or adjusted under 35 U.S.C. 154(b) by 663 days.

(21) Appl. No.: 12/086,956

(22) PCT Filed: Dec. 21, 2006

(86) PCT No.: PCT/JP2006/325460
§ 371 (c)(1),
(2), (4) Date: Jun. 23, 2008

(87) PCT Pub. No.: WO2007/072893
PCT Pub. Date: Jun. 28, 2007

(65) Prior Publication Data
US 2010/0305296 A1   Dec. 2, 2010

(30) Foreign Application Priority Data

Dec. 23, 2005  (CN) .......................... 2005 1 0022663
Apr. 12, 2006  (JP) ................................ 2006-110122

(51) Int. Cl.
*C08G 63/78* (2006.01)
(52) U.S. Cl.
USPC ......... 528/279; 528/272; 528/286; 528/308.1
(58) Field of Classification Search
USPC ................................................. 528/279, 286
See application file for complete search history.

(56) References Cited

U.S. PATENT DOCUMENTS

| 4,829,113 A * | 5/1989 | Rosenfeld ...................... 524/128 |
| 5,453,479 A | 9/1995 | Borman et al. ................ 528/279 |
| 2004/0266978 A1 | 12/2004 | Honda et al. .................. 528/279 |
| 2005/0131202 A1 | 6/2005 | Fujimori et al. ............... 528/272 |

FOREIGN PATENT DOCUMENTS

| JP | 07-118381 A | 5/1995 |
| JP | 07-138354 A | 5/1995 |
| JP | 10-158370 A | 6/1998 |
| JP | 2000-143789 A | 5/2000 |
| JP | 2000-256452 A | 9/2000 |
| JP | 2004-124067 A | 4/2004 |
| JP | 2004-217685 A | 8/2004 |
| JP | 2004-292657 A | 10/2004 |
| JP | 2005-15630 A | 1/2005 |
| JP | 2005-097466 A | 4/2005 |
| RO | 61430 | * 7/1976 |

* cited by examiner

Primary Examiner — Ling Choi
Assistant Examiner — Gennadiy Mesh
(74) Attorney, Agent, or Firm — Kubovcik & Kubovcik

(57) ABSTRACT

The invention relates to an improved linear microdialysis probe comprising a continuous length of flexible tubing (1) having at least one window (4) formed therein, said window covering at least one part of the circumference of the tubing, while the remaining part forms at least one unbroken connection between a first end of said tubing and a second end of said tubing, said ends adapted to be attached to an inlet for perfusion liquid and the other end forming an outlet for the dialysate, said at least one window (4) exposing a tubular semipermeable membrane (2).

4 Claims, No Drawings

CATALYST FOR PRODUCING POLYESTER AND METHOD FOR PRODUCING POLYESTER

This application is a 371 of international application PCT/JP2006/325460 filed Dec. 21, 2006, which claims priority based on Chinese patent application No. 200510022663.4 filed Dec. 23, 2005, and Japanese patent application No. 2006-110122 filed Apr. 12, 2006, each of which is incorporated herein by reference.

TECHNICAL FIELD

The present invention relates to a catalyst for producing a polyester and a method for producing a polyester. More particularly, the present invention relates to a method for producing a polyester which reduces generation of an extraneous material caused by the catalyst used at polymerization, and mold contamination during molding, and affords a polymer having remarkably excellent thermal stability and color tone as compared with the conventional polyester.

BACKGROUND ART

A polyester resin is used in many utilities due to its functional usefulness. For example, the polyester resin is used in fibers for clothing, materials, and medical services, films of wrapping materials, electrically insulating materials, and magnetic recording materials, and resin products. Among polyester resins, polyethylene terephthalate is excellent in general use, and practicability, and is suitably used.

In general, polyethylene terephthalate is produced from terephthalic acid or its ester-forming derivative, and ethylene glycol. In an industrial process for producing a polymer of a high molecular weight, an antimony compound is used as a polycondensation catalyst is widely used.

However, polyethylene terephthalate produced by using an antimony catalyst has some not preferable properties as described below.

For example, it is known that, when a polymer obtained by using an antimony catalyst is melt-spun into a fiber, the residue is sedimented around a spinneret pore. When this sedimentation progresses, since this becomes a cause for generation of a defect in a filament, necessity of removal at an appropriate time is generated. In addition, such the polyethylene terephthalate has not preferable properties that the antimony catalyst residue in a polymer easily becomes relatively greatly particulate, this becomes an extraneous material, and this becomes a cause for increase in a filtration pressure of a filter at molding processing, and yarn breakage upon spinning, or film breakage at film making, resulting in one cause for reduction in operability.

In addition, in film utility, an extremely flat film surface shape is desired mainly in a film for a magnetic recording medium in recent years. The extraneous material due to the antimony catalyst residue forms a coarse protrusion on such the film surface, being not preferable.

Under the aforementioned circumstances, a method for producing polyethylene terephthalate without using an antimony catalyst is desired. As a polycondensation catalyst other than an antimony compound, a germanium compound is known, but since the germanium compound is small in reserves, and rare, it is difficult to use the germanium compound for general-use.

In response to this problem, use of a titanium compound as a polymerization catalyst is being studied vigorously. Since the titanium compound has the higher catalyst activity, and the desired catalyst activity can be obtained by addition of a smaller amount as compared with the antimony compound, generation of an extraneous particle, and spinneret contamination can be suppressed. However, when the titanium compound is used as a polymerization catalyst, a side reaction is promoted due to the high activity and, as a result, a problem arises that thermal stability of the resulting polymer is deteriorated, and the polymer is colored yellow. Coloring of a polymer with yellowness is not the preferable property, for example, when the polyester is used in a fiber, particularly a fiber for clothing. Yellowness becomes problematic also when the polyester is used in a film, particularly an optical film.

In response to such the problem, improvement in heat resistance and a color tone of the polymer by addition of the titanium compound with a phosphorus compound is being studied widely. This method is to suppress the too high activity of titanium with the phosphorus compound to improve heat resistance and a color tone of the polymer. For example, Japanese Patent Application Laid Open (JP-A) No. 2004-292657 discloses a method of adding a phosphinic acid-based compound, a phosphine oxide-based compound, a phosphonous acid-based compound, a phosphinous acid-based compound or a phosphine-based compound as a phosphorus compound.

However, a problem arises that, when this method is used, a certain improvement in heat resistance of the polymer is in fact seen, but when the phosphorus compound is added at an amount or more, the polymerization activity of the titanium compound is suppressed too much, a goal polymerization degree is not attained, and a polymerization reaction time is remarkably prolonged, and as a result, a color tone of the polymer is deteriorated.

JP-A No. 2000-256452 discloses a method of limiting a mole ratio (Ti/P) of the titanium compound and the phosphorus compound in a range. According to this method, inactivation of the titanium compound catalyst can be in fact prevented, but heat resistance and a color tone at a level or higher can not be obtained.

In addition, JP-A No. 2004-124067 discloses a method of separating an interval between addition of the titanium compound and addition of the phosphorus compound. However, also in this method, inactivation of the titanium compound due to the phosphorus compound progresses in a polymerization reaction system and, when an addition amount of the phosphorus compound is large, inactivation of the catalyst is still caused.

JP-A No. 7-138354 discloses improvement in melt thermal stability and a color tone of the resulting polyester by coordination of the titanium compound and the phosphorus compound, but the improving effect is not sufficient.

Patent Literature 1: JP-A No. 2004-292657 (claims)
Patent Literature 2: JP-A No. 2000-256452 (claims)
Patent Literature 3: JP-A No. 2004-124067 (claims)
Patent Literature 4: JP-A No. 7-138354 (claims)

DISCLOSURE OF THE INVENTION

Problems to be Solved by the Invention

As described above, it was necessary to solve a conflicted problem that a side reaction is suppressed without deteriorating the polymerization reaction activity of the titanium compound.

An object of the present invention is to provide a catalyst which reduces generation of an extraneous material due to a catalyst, spinneret contamination at molding, and a surface coarse protrusion of a molded article, and affords a polyester remarkably excellent in thermal stability and a color tone as compared with the previous product, and a method for producing such the polyester.

Means to Solve the Problem

The present invention is a catalyst for producing a polyester by a polymerization reaction of aromatic dicarboxylic acid or a derivative thereof and aliphatic diol, comprising a titanium compound, and a phosphorus compound of the formula (1) described later.

Also, the present invention is a method for producing a polyester comprising adding a phosphorus compound represented by the formula (2) described later to a reaction system, in a method for obtaining a polyester by esterification or transesterification-reacting dicarboxylic acid or an ester-forming derivative thereof, and a diol or an ester-forming derivative thereof and, thereafter, polycondensing this in the presence of a titanium-based polycondensation catalyst.

Also, the present invention is a coloration preventing agent for a polyester represented by the formula (3) described later.

Effect of the Invention

By the polymerization catalyst of the present invention, a polyester having remarkably improved color tone and heat resistance as compared with the previous product can be obtained. This polyester is suitable in utility of a fiber, a film, a bottle and the like. Further, in production of their molded article, a problem such as color tone deterioration, spinneret contamination, increase in filtration pressure, yarn breakage, film making breakage and the like can be overcome.

BEST MODE FOR CARRYING OUT THE INVENTION

The catalyst for producing the polyester of the present invention comprises a titanium compound, and a phosphorus compound represented by the formula (1). And, the catalyst in the present invention may not be necessarily a mixture of the titanium compound and the phosphorus compound represented by the formula (1), and the compounds may be independently added separately. That is, the titanium compound and the phosphorus compound of the formula (1) may be contained as a catalyst component in the polyester.

The phosphorus compound represented by the formula (1) is a phosphorous acid ester.

[Chemical formula 1]

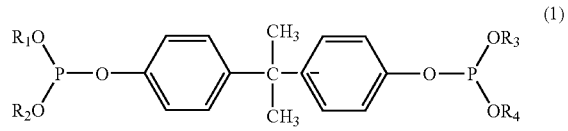

(1)

In the formula, $R_1$, $R_2$, $R_3$ and $R_4$ are an alkyl group, a cycloalkyl group, an alkyl-substituted benzene group, or a benzyl group carbon number of which is 4 to 25.

Examples of such the substituent include 3-methyl-5-ethyloctane group, a 2,5-dimethyl-3,4-diethylhexane group, a lauryl group, a stearyl group, a 2,3,7-trimethyl-5-ethyloctane group, a 2,4-dibutylphenyl group, an octanephenyl group, a nonylphenyl group, bisphenol A, and a branched decanephenyl group. As the substituent, a linea structure is more preferable than a branched structure due to better compatibility with the polyester. Further, among the linear structure, an alkyl group of a carbon number of 8 to 16 is preferable in improvement in a color tone. A lauryl group which is a linear alkyl group of a carbon number of 12 is most preferable.

A phosphorous acid ester which is phosphorus compound of the formula (1) in the present invention can be produced, for example, by the following method.

An alcohol and bisphenol A, and triphenyl phosphite are reacted in the presence of a catalyst to obtain a mixture of the phosphorus compound of the formula (1), and phenol. Thereafter, the phosphorus compound of the formula (1) can be obtained by removing phenol.

In such the production method, a group derived from an alcohol is $R_1$ to $R_4$ of the formula (1). As the alcohol which is a raw material, an alcohol obtained from a palm oil is good. In the alcohol, a C12 alcohol accounts for about 70% by weight, and a C14 alcohol accounts for about 30% by weight. Detailed components of the palm oil are generally such that n-hexanoic acid is 0.2 to 0.5% by weight, n-octanoic acid is 5.4 to 9.5% by weight, n-decanoic acid is 4.5 to 9.7% by weight, lauric acid is 44.1 to 51.0% by weight, myristic acid is 13.1 to 18.5% by weight, palm acid is 7.5 to 10.5% by weight, stearic acid is 1.0 to 3.2% by weight, arachidic acid is 0.2 to 1.5% by weight, oleic acid is 5.0 to 8.2% by weight, and conjugated linoleic acid is 1.0 to 2.6% by weight.

Further, since the phosphorus compound of the formula (1) is easily degraded due to the presence of a moisture, it is preferable to dehydration-treat it with a molecular sieve (synthetic zeolite). A moisture content is preferably not more than 2%, more preferably not more than 1%.

The titanium compound which is a polymerization catalyst in the present invention is one kind of metal compounds. The catalyst in polyester polymerization generally refers to a compound contributing to reaction promotion of an element reaction of all or a part of the following (1) to (3), in a polymer synthesized from dicarboxylic acid or an ester-forming derivative thereof and a diol or an ester-forming derivative thereof. It is important that the catalyst of the present invention has the effect of contributing to promotion of a (3) reaction.

(1) An esterification reaction in which a dicarboxylic acid component and a diol component are reacted to form an ester.

(2) A transesterification reaction in which an ester-forming derivative component of a dicarboxylic acid, and a diol component are reacted to form an ester.

(3) A polycondensation reaction in which a polyethylene terephthalate low-molecular polymer obtained by the (1) or (2) reaction is converted into a high polymerization degree by a de-diolation reaction.

Since a titanium oxide particle which is generally used as an inorganic particle in a matting agent for a fiber has substantially no catalyst activity on the reaction, it is different from the titanium compound which can be used as the catalyst of the present invention.

It is preferable that the polymerization catalyst of the present invention further comprises an alkali metal. Preferable examples of the alkali metal include potassium, sodium, and lithium.

In addition, it is preferable from a viewpoint of thermal stability and a color tone of a polymer that titanium and a ligand form a chelate.

Example of the ligand include a ketone group, an aldehyde group, a carboxyl group, and an ester group, each having a carbon number of 1 to 30, specifically, succinic acid, adipic acid, phthalic acid, terephthalic acid, vinyl acetate, methyl formate, dimethyl adipate ester, n-pentyl acetate, acetophenone, 2-phenylacetone, m-hydroxybenzaldehyde, 2-crotonealdehyde, and 3-phenyl group acrolein. Among them, polycarboxylic acid and/or hydroxycarboxylic acid and/or nitrogen containing carboxylic acid are preferable. Preferable examples of polycarboxylic acid include phthalic acid, trimellitic acid, trimesic acid, hemillitic acid, pyromellitic acid and the like, examples of hydroxycarboxylic acid include lactic acid, malic acid, tartaric acid, citric acid and the like, and examples of nitrogen-containing carboxylic acid include ethylenediaminetetraacetic acid, nitrilotripropionic acid carboxyiminodiacetic acid, carboxymethyliminodipropionic acid, diethyltriaminepentaacetic acid, triethylenetetraminehexaacetic acid, iminodiacetic acid, iminodipropionic acid, hydroxyethyliminodiacetic acid, hydroxyethyliminodipropionic acid, methoxyethyliminodiacetic acid and the like. These compounds may be used alone, or may be used jointly.

In the method of synthesizing a titanium catalyst for polyester polymerization of the present invention, (1) the titanium compound is mixed with a solvent to dissolve a part or all of it in the solvent. Alternatively, (2) when the polycarboxylic acid, the hydroxycarboxylic acid, the nitrogen-containing carboxylic acid or the like is used as a chelating agent of the titanium compound, either the titanium compound or the chelating agent is mixed with a solvent to dissolve a part or all of it in a solvent, the other is dissolved in a stock solution or a solvent to dilute it, and the solution is added dropwise to this mixed solution. The reaction condition is performed by heating at a temperature of 0 to 200° C. for 1 minute or longer, preferably at a temperature of 20 to 100° C. for 5 to 300 minutes. Thereupon, a reaction pressure is not particularly limited, but may be a normal pressure.

Examples of the solvent include water, methanol, ethanol, ethylene glycol, propanediol, butanediol, benzene, and xylene, and the solvent is preferably one kind or two kinds of them. In addition, from a viewpoint of thermal stability and a color tone, it is preferable that the titanium compound and the phosphorus compound are prepared in a solvent at a pH=4 to 7, and an acidic compound such as hydrochloric acid, sulfuric acid, nitric acid, p-toluenesulfonic acid and the like, and a Good buffer such as MES (pH=5.6 to 6.8), ADA (pH=5.6 to 7.5) and the like may be used.

An addition amount of the catalyst relative to a weight of the polyester is preferably 1 to 20 ppm in titanium atom terms. Herein, since a titanium oxide particle has no catalyst activity, titanium oxide is removed from calculation. At 3 to 15 ppm, further preferably 3 to 8 ppm, thermal stability and a color tone polymer become better, being preferable. In addition, it is preferable to add the catalyst so that the phosphorus compound becomes 1 to 100 ppm in phosphorus atom terms relative to the polyester. From thermal stability and a color tone of the polyester at yarn production or film making, an addition amount of phosphorus is preferably 5 to 75 ppm, further preferably 10 to 50 ppm. In addition, when a titanium atom in the titanium compound and a phosphorus atom in the phosphorus compound have a mole ratio of Ti/P=0.01 to 1.5, thermal stability and a color tone of the polyester become better, being preferable. More preferable is Ti/P=0.04 to 0.75, and further preferable is Ti/P=0.1 to 0.5.

In addition, when the catalyst of the present invention further comprises at least one kind selected from the group consisting of a magnesium compound, a manganese compound, calcium compound, and a cobalt compound, the reaction activity and a color tone of the polymer become better, being preferable. Examples of the magnesium compound include organic magnesium compounds such as, magnesium oxalate, magnesium propionate, magnesium acrylate, magnesium acetate, magnesium stearate and the like and inorganic magnesium compound such as magnesium hydroxide, magnesium sulfate, magnesium chloride and the like. A preferable magnesium compound is an organic magnesium compound. A particularly preferable organic magnesium compound is a magnesium acetate compound. Examples of the manganese compound include specifically manganese chloride, manganese bromide, manganese nitrate, manganese carbonate, manganese acetylacetonate, manganese acetate and the like. Examples of the calcium compound include specifically calcium oxide, calcium hydroxide, calcium alkoxide, calcium acetate, calcium carbonate and the like. Examples of the cobalt compound include specifically cobalt chloride, cobalt nitrate, cobalt carbonate, cobalt acetylacetonate, cobalt naphthenate, cobalt acetate tetrahydrate and the like. Among them, from a viewpoint of a color tone, and polymerization activity, a magnesium compound is preferable and, particularly, magnesium acetate is preferable. Since the magnesium compound of course has the polymerization activity and has the effect of reducing a volume resistivity at melting of a polyester resin (melt specific resistance), there is also an advantage that electro-pinning at film manufacturing becomes better. When the polyester resin is used in film utility, addition is particularly preferable.

It is preferable to add at least one kind selected from the group consisting of a magnesium compound, a manganese compound, a calcium compound, and a cobalt compound so that a sum in atom terms of magnesium, manganese, calcium and cobalt relative to a polyester is 1 to 100 ppm. When a sum in atom terms of magnesium, manganese, calcium and cobalt relative to the polyester is not more than 1 ppm, the effect is low and, in film utility, electro-pinning becomes insufficient. At 100 ppm or higher, thermal stability and a color tone are deteriorated. More preferable is 3 to 75 ppm, and particularly preferable is 5 to 50 ppm. Thereupon, it is preferable from a viewpoint of a color tone and thermal stability that a mole ratio of a sum in atom terms of magnesium, manganese, calcium and cobalt, and a phosphorus atom of the phosphorus compound (Mg+Mn+Ca+Co)/P is 0.1 to 10. More preferable is 0.2 to 5, and further preferable is 1 to 3. Particularly, when an amount in atom terms of magnesium relative to the polyester is 5 to 25 ppm and when a mole ratio (Mg/P) of a sum in atom terms of magnesium, and a phosphorus atom of the phosphorus compound is 1 to 3, both of a color tone and thermal stability are better.

A mole ratio of magnesium and phosphorus is more preferably $0.1 \leq Mg/P \leq 17$. It is further preferable that an addition amount of a titanium element relative to a weight of the polyester is 3 ppm$\leq$Ti$\leq$8 ppm, and a mole ratio of a sum of mole amounts of titanium magnesium, and phosphorus is $0.3 \leq (Ti+Mg)/P \leq 18$.

Although a method of improving a color tone by adding the cobalt compound at producing of the polyester is known, since addition of a large amount reduces melt thermal stability of the polyester, this is not preferable. When the catalyst of the present invention is used, since the polyester of a good color tone is obtained without adding a large amount of the cobalt compound, the resulting polyester is excellent in thermal stability.

Property of the polyester obtained by the catalyst of the present invention is good, a content of a diethylene glycol component (DEG) is 1.5% by weight or less, and a heat resistance index is 1.1 or less. Further, a melt specific resistance of the polyester is $0.5 \times 10^8$ to $10 \times 10^8$ $\Omega \cdot cm$.

Then, a method for producing the polyester will be explained. Dicarboxylic acid or an ester-forming derivative thereof, and a diol or an ester-forming derivative thereof are esterified or transesterified, and polycondensed to synthesize a polyester. As the diol, aliphatic diol is preferable, and as dicarboxylic acid, aromatic dicarboxylic acid is preferable.

Examples of the polyester obtained by such the production method include polyethylene terephthalate, polytrimethylene terephthalate, polytetramethylene terephthalate, polycyclohexylenedimethylene terephthalate, polyethylene-2,6-naphthalene dicarboxylate, polyethylene-1,2-bis(2-chlorophenoxy)ethane-4,4'-dicarboxylate and the like. The present invention is suitable, inter alia, in polyethylene terephthalate which is most generally used, or a polyester copolymer comprising mainly an ethylene terephthalate unit.

In the method for producing the polyester of the present invention, it is essential that a phosphorus compound represented by the formula (2) as the phosphorus compound is added at an arbitrary time.

[Chemical formula 2]

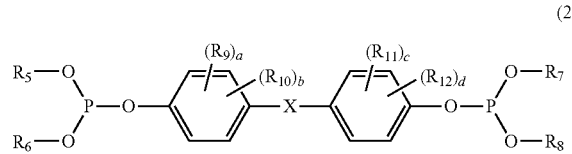

(2)

(In the formula (2), X represents a hydrocarbon group of a carbon number of 1 to 10, or sulfur. The hydrocarbon group may contain one or more of an alicyclic structure, an aromatic ring structure and a double bond, or may contain a substituent. $R_5$ to $R_8$ each represent independently a group selected from a hydroxy group, a hydrocarbon group of a carbon number of 1 to 30, and an alkoxy group of a carbon number of 1 to 30. And, the hydrocarbon group may contain one or more structures selected from an alicyclic structure, an aliphatic branched structure, an aromatic ring structure and a double bond. $R_9$ to $R_{12}$ each represent independently a group selected from a hydroxyl group, a hydrocarbon group of a carbon number of 1 to 10, and an alkoxy group of a carbon number of 1 to 10. The hydrocarbon group may contain one or more structures selected from an alicyclic structure, an aliphatic branched structure, an aromatic ring structure and a double bond. And, a+b and c+d are each an integer of 0 to 4)

In a method for obtaining a polyester by polycondensation in the presence of a titanium-based polycondensation catalyst, when the phosphorus compound represented by the formula (2) is added, surprisingly, a color tone and heat resistance of the resulting polymer are remarkably improved.

Deterioration of coloration and heat resistance of the polyester is caused by a side reaction of the polyester as disclosed in Saturated Polyester Resin Handbook (THE NIKKAN KOGYO SHIMBUN, LTD., initial edition, P. 178-198). In this polyester side reaction, it is thought that carbonyl oxygen is activated with a metal catalyst, and β hydrogen is abstracted, thereby, a vinyl terminal group component and an aldehyde component are generated. By formation of polyene by this vinyl terminal group, the polymer is colored yellow. In addition, since a main chain ester bond is cut due to generation of an aldehyde component, a polymer inferior in heat resistance is obtained. It is presumed that, particularly, when the titanium compound is used as a polymerization catalyst, since activation of a side reaction due to heat is very strong, a vinyl terminal group component and an aldehyde component are generated much, and a yellowed polymer inferior in heat resistance is obtained.

In the previous phosphorus compound, the activity of the titanium catalyst was controlled by interacting this titanium compound with a phosphorus compound suitably. However, in the previous phosphorus compound, reduction in the activity of a side reaction of the titanium compound and polymerization activity could not be avoided. Meanwhile, the phosphorus compound represented by the formula (2) of the present invention can suppress only the side reaction activity extremely small while the polymerization activity of the titanium compound is sufficiently retained. This mechanism is not completely revealed now, but it is presumed that a phosphorus compound like the phosphorus compound of the formula (2) has the small activity of suppressing the activity of a titanium catalyst, and inhibits a polymerization reaction to a small extent, while at a later stage of polymerization, its structure is changed, resulting in suppression of the side reaction activity of the titanium catalyst. This is essentially different from the effect of the previous phosphorus compound on the titanium compound, or at least could not be sufficiently attained by the previous phosphorus compound.

Inter alia, a phosphorus compound selected from compounds represented by the formula (3) to the formula (5) is preferable from a viewpoint of a color tone and heat resistance.

[Chemical formula 3]

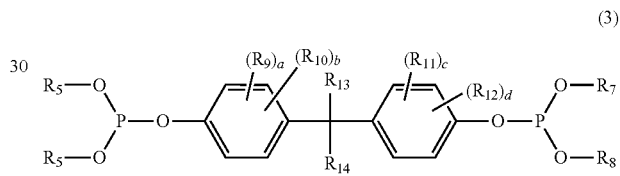

(3)

[Chemical formula 4]

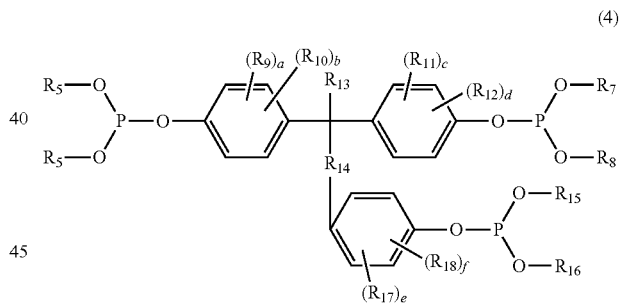

(4)

[Chemical formula 5]

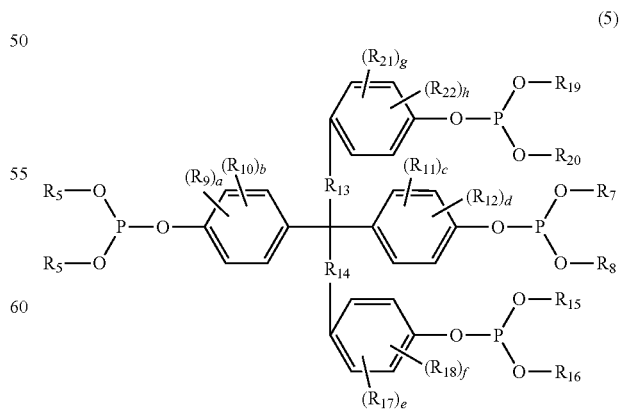

(5)

In the formulas (3) to (5), $R_5$ to $R_8$, $R_{15}$, $R_{16}$, $R_{19}$ and $R_{20}$ each represent independently a group selected from a hydroxy group, a hydrocarbon group of a carbon number of 1 to 30, and an alkoxy group of a carbon number of 1 to 30. And, the hydrocarbon group may contain one or more structures selected from an alicyclic structure, an aliphatic branched structure, an aromatic ring structure and a double bond. $R_9$ to $R_{12}$, $R_{17}$, $R_{18}$, $R_{21}$ and $R_{22}$ each represent independently a group selected from a hydroxy group, a hydrocarbon group of a carbon number of 1 to 10, and an alkoxy group of a carbon number of 1 to 10. The hydrocarbon group may contain one or more structures selected from an alicyclic structure, an aliphatic branched structure, an aromatic ring structure and a double bond. And, a+b, c+d, e+f and g+h are each an integer of 0 to 4. $R_{13}$ and $R_{14}$ each represent hydrogen or a hydrocarbon group of a carbon number of 1 to 10. The hydrocarbon group may contain one or more structures selected from an alicyclic group, an aliphatic branched structure, an aromatic ring structure and a double bond.

Particularly, when $R_5$ to $R_8$, $R_{15}$, $R_{16}$, $R_{19}$ and $R_{20}$ are each a hydrocarbon group of a carbon number of 5 to 20, $R_9$ to $R_{12}$, $R_{17}$, $R_{18}$, $R_{21}$ and $R_{22}$ are each a hydrocarbon group of a carbon number of 1 to 5, $R_{13}$, and $R_{14}$ are hydrogen or a hydrocarbon group of a carbon number of 1 to 5, a color tone and heat resistance of the resulting polyester become better, being preferable.

As the phosphorus compound represented by the formula (3), for example, as the compound in which a+b=0, c+d=0, $R_9$, and $R_{10}$=methyl group, there is 4,4'-isopropylidene-diphenol alkyl (C12-C15) phosphite. This compound is available as Adekastab (registered trade mark) 1500 (manufactured by ADEKA Corporation) or JA-805 (manufactured by Johoku Chemical Co., Ltd.). In addition, as the compound in which a, c=1 ($R_5$, $R_7$=methyl group), b, d=1 ($R_6$, $R_8$=tert-butyl group), $R_9$=hydrogen, $R_{10}$=propyl group, there is 4,4'-butylidene-bis(3-methyl-6-t-butylphenyl-di-tridecyl) phosphite. This compound is available as Adekastab (registered trade mark) 260 (manufactured by ADEKA Corporation).

In addition, as the phosphorus compound represented by the formula (4), for example, as the compound in which a, c, e=1 ($R_5$, $R_7$, $R_{13}$=methyl group), b, d, f=1 ($R_6$, $R_8$, $R_{14}$=tert-butyl group), $R_9$=hydrogen, and $R_{10}$=isopropyl group, there is 1,1,3-tris(2-methyl-4-di-tridecylphosphite-5-tert-butylphenyl)butane, and is available as Adekastab (registered trade mark) 522A (manufactured by ADEKA Corporation). These compounds may be used alone or may be used jointly.

More preferably, when the compound represented by the formula (1), and more preferably by the formula (3), is further preferably a compound in which $R_5$ to $R_8$ are a linear alkyl group of a carbon number of 8 to 16, $R_9$ to $R_{12}$ are hydrogen, and $R_{13}$ and $R_{14}$ are a methyl group, this is preferable from a viewpoint of a color tone of the resulting polyester.

When the phosphorus compound is added to the polyester, the phosphorus compound may be added alone, or may be added in the state where the compound is dissolved or dispersed in a diol compound such as ethylene glycol and the like.

Further, as described above, when at least one kind selected from the group consisting of a magnesium compound, a manganese compound, a calcium compound and a cobalt compound is added to a reaction system, the reaction activity and a color tone of the polymer become good, being preferable. A preferable addition amount of these compounds, or the phosphorus compound is as described above.

In addition, as described above, when the titanium compound of a polymerization catalyst is a titanium complex in which polycarboxylic acid and/or hydroxycarboxylic acid and/or nitrogen-containing carboxylic acid are a chelating agent, this is preferable from a viewpoint of thermal stability and a color tone of the polymer.

In the method for producing the polyester of the present invention, a polymerization catalyst and an additive may be added as they are to a reaction system of polyester. When those compounds are mixed with a solvent containing a diol component forming a polyester such as ethylene glycol and propylene glycol in advance, and the resulting solution or the slurry is added to a reaction system, generation of an extraneous material in the polymer is more suppressed, being preferable. If necessary, before addition, a low boiling point component such as an alcohol and the like used at synthesis of those compounds may be removed. In the case of the phosphorus compound, as described above, it is preferable that a moisture is reduced, and it is preferable that a moisture rate of ethylene glycol or propylene glycol to be mixed is reduced.

As for a time of adding the catalyst, as an esterification reaction catalyst or a transesterification reaction catalyst may be added immediately after raw material addition, or together with a raw material. Further, there is a method of adding the titanium compound immediately after raw material addition, or together with a raw material, and adding only the phosphorus compound for 1 hour to 1 minute from polymerization completion. When the phosphorus compound is added before 1 hour to 1 minute from polymerization completion, since the polymerization reaction is almost completed, it becomes possible to add the phosphorus compound at a large amount, and this is preferable for improving a color tone of the resulting polyester.

When the catalyst is added as a polycondensation reaction catalyst, addition may be substantially before initiation of a polycondensation reaction, and the catalyst may be added any time such as before an esterification reaction or a transesterification reaction, or after completion of the reaction, or before initiation of the polycondensation reaction. An order of addition of at least one kind compound selected from the group consisting of a titanium compound, a phosphorus compound, a magnesium compound, a manganese compound, a calcium compound and a cobalt compound to a reaction system is not particularly limited, but it is preferable that these compounds are mixed before addition to a reaction system. By mixing these compounds before addition, improvement in thermal stability and a color tone of the resulting polyester can be enhanced, and a carboxyl terminal amount can be suppressed. The mixing condition is performed by stirring at a temperature of 0 to 200° C. for 1 minute or longer, preferably at a temperature of 10 to 100° C. for 5 minutes to 300 minutes. Thereupon, a reaction pressure is not particularly limited, but may be a normal pressure.

When the phosphorus compound is added before 1 hour to 1 minute from polymerization completion, it is preferable that the phosphorus compound is added as it is to a polymerization apparatus in the reduced pressure state. In the case of addition of the phosphorus compound by the aforementioned method, when a diol component such as ethylene glycol and the like is brought and added at a large amount, since depolymerization of the polyester (a reaction of cutting a polyester main chain) progresses, a method of adding a phosphorus compound alone, or adding a master pellet containing phosphorus compound at a high concentration is preferable. Thereupon, the phosphorus compound may be added by dividing into a few times, or may be continuously added with a feeder. In addition, it is preferable that the method of adding the phosphorus compound is performed by filling the phosphorus compound into a container which can be dissolved or melted in a polymerization system and consists of a polymer of substantially the same component as that of a polymer obtained by the present invention. When the phosphorus compound is added by placing into the container, by adding to a polymerization reactor under the reduced pressure condition, evaporation of the phosphorus compound, and flowing out of the phosphorus compound into a reduced pressure line can be prevented and, at the same time, a desired amount of the phosphorus compound can be added to the polymer. The container referred in the present invention may be a container into which the phosphorus compound is placed as a whole and, for example, an injection-molded container having a lid or a plug, and a bag obtained by sealing or sewing a sheet or a film are included. It is further preferable that an air extractor is made in the container. When the phosphorus compound is placed in a container equipped an air extractor, and addition is performed, even if added to a polymerization reactor under the vacuum condition, the container is not ruptured due to air inflation to flow out the phosphorus compound into a reduced pressure line, or the phosphorus compound is not adhered to an upper part or a wall surface of the polymerization reactor, thereby, a desired amount of the phosphorus compound can be added to the polymer. As for a thickness of this container, when a thickness is too great, a longer time for dissolution or melting is taken, therefore, a smaller thickness is good, and a thickness to such an extent that the container is not ruptured upon work of sealing/adding the phosphorus compound is preferable. For this reason, a uniform container having a thickness of 10 to 500 μm and having no uneven is preferable.

Further, in the method for producing the polyester of the present invention, as a color tone adjusting agent, a blue adjusting agent and/or a red adjusting agent may be added.

The color tone adjusting agent in the present invention is a dye used in a resin or the like, and examples expressed by COLOR INDEX GENERIC NAME include a blue color tone adjusting agent such as SOLVENT BLUE 104, SOLVENT BLUE 122, SOLVENT BLUE 45 and the like, a red color tone adjusting agent such as SOLVENT RED 111, SOLVENT RED 179, SOLVENT RED 195, SOLVENT RED 135, PIGMENT RED 263, VAT RED 41 and the like, and a purple color tone adjusting agent such as DESPERSE VIOLET 26, SOLVENT VIOLET 13, SOLVENT VIOLET 37, SOLVENT VIOLET 49 and the like. Among them, SOLVENT BLUE 104, SOLVENT BLUE 45, SOLVENT RED 179, SOLVENT RED 195, SOLVENT RED 135, and SOLVENT VIOLET 49 which do not contain a halogen being easily a cause for apparatus corrosion, are relatively good in heat resistance at a high temperature, and are excellent in color developing property are preferably used.

In addition, one kind or a plurality of kinds of these color tone adjusting agents can be used depending on the purpose. Particularly, when each one or more kinds of the blue adjusting agent and the red adjusting agent are used, a color tone can be controlled finely, being preferable. Further, in this case, when a ratio of the blue adjusting agent relative to a total amount of color tone adjusting agents added is not less than 50% by weight, a color tone of the resulting polyester becomes particularly better, being preferable.

It is preferable that a content of the color tone adjusting agent in the polyester expressed as a total amount is finally 30 ppm or less. When the content is more than 30 ppm, transparency of the polyester is reduced, or dull color development is seen in some cases.

It is preferable that the color tone adjusting agent is added to the polyester at an arbitrary time after completion of the esterification reaction or the transesterification reaction, and to completion of the polycondensation reaction. Particularly, when the color tone adjusting agent is added during after completion of the esterification reaction or the transesterification reaction to initiation of the polycondensation reaction, the agent is dispersed in a polyester well, being preferable.

The polyester obtained by the production method of the present invention has an inherent viscosity ($[\eta]$) as measured at 25° C. using orthochlorophenol as a solvent, of preferably 0.4 to 1.0 $dlg^{-1}$, further preferably 0.5 to 0.8 $dlg^{-1}$, particularly preferably 0.6 to 0.7 $dlg^{-1}$.

In addition, in order to improve thermal stability which is an object of the present invention, it is preferable that a terminal carboxyl group concentration of the polyester is in a range of 1 to 30 equivalent/ton. As a terminal carboxyl group concentration is lower, thermal stability is improved, and contamination adhered to a mold or the like at molding, and contamination adhered to a spinneret at yarn manufacturing are remarkably reduced. When a terminal carboxyl group concentration is more than 30 equivalent/ton, the effect of reducing contamination adhered to a mold or a spinneret is decreased in some cases. A terminal carboxyl group concentration is preferably not more than 25 equivalent/ton, particularly preferably not more than 20 equivalent/ton.

In addition, in the polyester obtained by the production method of the present invention, it is preferable that change in carboxyl terminal amount $\Delta COOH_{290}$ before and after melting at 290° C. for 30 minutes under the nitrogen atmosphere after drying under reduced pressure at 150° C. for 12 hours is in a range of 0 to 7.5 equivalent/ton. As this value is smaller, thermal stability is higher, and contamination adhered to a mold or the like at molding, and contamination adhered to a spinneret at yarn manufacturing are reduced. When this value is more than 7.5 equivalent/ton, thermal stability is inferior, and a material adhered to a mold or a spinneret is increased. Preferable is not more than 5.0 equivalent/ton, and particularly preferable is not more than 3.5 equivalent/ton.

In the polyester obtained by the production method of the present invention, it is preferable that a change $\Delta b$ value$_{290}$ in a color tone b value before and after melting at 290° C. for 30 minutes under the nitrogen atmosphere after drying under reduced pressure at 150° C. for 12 hours is in a range of 0 to 4.0. As this value is smaller, degradation/coloration due to thermal deterioration is smaller, and thermal stability is more excellent. When this value is more than 4.0, discoloration of the polymer at molding processing such as at spinning and at filmmaking becomes greater. Preferable is not more than 2.5, and particularly preferable is not more than 1.5.

In the polyester obtained by the method for producing a polyester of the present invention, when a content of the diethylene glycol component is not more than 0.1 to 1.5% by weight, mold contamination at molding is small, being preferable. More preferable is not more than 1.3% by weight, and particularly preferable is not more than 1.1% by weight.

In addition, in the polyester obtained by the production method of the present invention, when a content of acetoaldehyde is not more than 1 to 15 ppm, adverse influence on a flavor and a fragrance in a molded article is suppressed, being preferable. More preferable is not more than 13 ppm, and particularly preferable is not more than 11 ppm.

In the polyester obtained by the production method of the present invention, it is preferable from a viewpoint of a color tone of a molded article such as a fiber and a film that a color tone in a chip shape as expressed by a Hunter value is such that an L value is in a range of 50 to 95, an a value is in a range of −6 to 2, and a b value is in a range of −5 to 10. Further preferable is such that an L value is in a range of 60 to 90, an a value is in a range of −5 to 1, and a b value is in a range of −3 to 8.

The method for producing a polyester of the present invention will be explained. As an embodiment, an example of polyethylene terephthalate is described, being not limiting.

Polyethylene terephthalate is usually produced by any of the following processes. That is, (A) a process of obtaining a low-molecular polymer by a direct esterification reaction using terephthalic acid and ethylene glycol as a raw material and, thereafter, obtaining a high-molecular polymer by a polycondensation reaction, (B) a process of obtaining a low-molecular polymer by a transesterification reaction using dimethyl terephthalate and ethylene glycol as a raw material and, thereafter, obtaining a high-molecular polymer by a polycondensation reaction. Herein, an esterification reaction progresses without a catalyst, and the aforementioned titanium compound may be added as a catalyst. In addition, in a transesterification reaction, the reaction progresses using magnesium compound, manganese compound, calcium compound, cobalt compound, zinc compound, lithium compound or the like, or the titanium compound as a catalyst and, after substantial completion of the transesterification reaction, the phosphorus compound is added in order to inactivate a catalyst used in the reaction.

To the low-molecular polymer obtained by a former esterification reaction or transesterification reaction among a series of reactions of (A) or (B) is added a polycondensation catalyst and, thereafter, a polycondensation reaction is performed, thereby, high-molecular polyethylene terephthalate can be obtained. If necessary, before the polycondensation reaction, a titanium oxide particle, a color tone adjusting agent, and a cobalt compound may be added. The reaction can be adapted to a method of batch, semi-batch and continuous systems.

It is also possible to add the color tone adjusting agent substantially after completion of the polycondensation reaction. In this case, the color tone adjusting agent is directly melted and kneaded into a chip using a monoaxial or biaxial extruder, or a polyester containing the color tone adjusting agent at a high concentration is prepared separately in advance, and this may be blended with a chip containing no color tone adjusting agent.

EXAMPLES

The present invention will be explained in more detail below by way of Examples. Physical properties in Examples were measured by the following methods.
(1) Inherent Viscosity IV of Polymer To 10 ml of orthochlorophenol was added 0.1 g of a polymer, and the polymer was dissolved at 100° C. over 30 minutes. Thereafter, a viscosity of the solution at 25° C. was measured using an Ostwald's viscometer to obtain an inherent viscosity.
(2) Melt Thermal Stability A polyester was placed in a test tube having an external diameter of 10 mm, an internal diameter of 8 mm, and a length of 250 mm, and it is melted at 290° C. for 15 minutes in nitrogen. An inherent viscosity of the polyester before and after heat treatment is measured.

Melt thermal stability is calculated by the following equation.

Main chain cutting number =

$$\{[IV_1/(3.07*10^{-4})]^{-1.30} - [IV_0/(3.07*10^{-4})]^{-1.30}\}*10^6$$

In the equation, $IV_0$ is an inherent viscosity of the polyester before heat treatment, and $IV_1$ is an inherent viscosity of the polyester after heat treatment.
(3) Carboxy Terminal Amount of Polymer Using orthocresol as a solvent, and using a 0.02N NaOH aqueous solution at 25° C., a carboxyl terminal amount was measured by titration with an automatic titration device (COM-550, manufactured by Hiranuma Sangyo Co., Ltd.).
(4) Color Tone of Polymer Using a color meter (SM color computer-type SM-T45, manufactured by Suga Test Instrument Co., Ltd.), a Hunter value (L, a, b values) was measured.
(5) Melt Specific Resistance Using two copper plates as an electrode, an insulating isolating plate is placed to form an electrode having a copper plate area of 22 cm$^2$, and a copper plate interval of 9 mm. This electrode is placed in a melt polymer under 290° C., a 5,000V voltage is applied between electrodes, and a volume inherent resistance value (melt specific resistance) is calculated using a current amount thereupon.

Melt resistance can be calculated by the following equation.

$$\text{Melt specific resistance } (\Omega \cdot \text{cm}) = \frac{\{\text{voltage (V)} \times \text{electrode area (cm}^2)\}}{\{\text{current (A)} \times \text{electrode interval (cm)}\}}$$

(6) Diethylene Glycol Content of Polymer

The polyester to be measured was dissolved in monoethanolamine, a 1,6-hexanediol/methanol mixed solution was added, and this was cooled. The resulting mixture was neutralized, and centrifuged, an amount of diethylene glycol in the supernatant was measured by gas chromatography (GC-14A, manufactured by Shimadzu Corporation).
(7) Content of Acetoaldehyde of Polymer The polyester to be measured was heat-extracted at 160° C. for 2 hours under nitrogen sealing using pure water. An amount of acetoaldehyde in the extract was measured using gas chromatography ("GC-14A") and using isobutyl alcohol as an internal standard.
(8) $\Delta COOH_{290}$, $\Delta b$ Value$_{290}$ The polyester to be measured was dried at 150° C. for 12 hours under reduced pressure, and heat-melted at 290° C. for 30 minutes under the nitrogen atmosphere and, thereafter, a carboxyl terminal amount and a color tone were measured by the (1) and (3) methods. Differences before and after heat melting were $\Delta COOH_{290}$, and $\Delta b$ value$_{290}$, respectively.
(9) Observation of Sedimented Material of Spinneret Polyester was melted at 295° C., and extruded through a spinning spinneret having a pore diameter of 0.35 mm$\phi$ and a pore number of 12. An amount of a sedimented material around a spinneret pore 72 hours after spinning of a fiber was observed using a long focus microscope. Determination was performed as follows: the state where little sedimented material is recognized was designated as A, the state where a sedimented material is recognized, but operation is possible was designated as B, and the state where a sedimented material is recognized, and yarn breakage occurs frequently was designated as C.
(10) Spinneret Extraneous Sedimentation Height The polyester was melted at 295° C., extruded through a spinneret having a pore diameter of 0.35 mm$\phi$ and a pore number of 12, spinning was continued at 600 m/min for 7 days, and a height of a layer of an adhered material (spinneret extraneous sedimentation height, unit μm) generated at an outer edge of an extrusion pore of a spinneret was measured.

As a height of this adhered material layer is greater, bending is easily caused in a filamentous stream of an extruded polyester melt, and spinnability of this polyester is reduced. That is, a height of an adhered material layer generated at a spinneret (spinneret extraneous sedimentation height) is an index of spinnability of a monofilament of the polyester.

<Synthesis of Lactic Acid Chelate Titanium Catalyst>

A 2 liter flask equipped with a stirrer, a condenser and a thermometer was charged with titanium tetraisopropoxide (288 g, 1 mole equivalent), and ethylene glycol (218 g, 3.5 mole equivalent) was added through an addition funnel while stirring. An addition rate was controlled so that the reaction heat warms a flask content to about 50° C. The reaction mixture was stirred for 15 minutes, 252 g (corresponding to 2 mole in terms of ammonium lactate) of a 85% ammonium lactate aqueous solution was added to obtain a transparent pale yellow product. This was diluted with ethylene glycol to obtain an ethylene glycol solution at 1% by weight in terms of a titanium element.

<Synthesis of Citric Acid Chelate Titanium Catalyst>

A 3 liter flask equipped with a stirrer, a condenser and a thermometer was charged with warm water (371 g), and citric acid monohydrate (532 g, 2.5 mole equivalent) was dissolved therein. While this solution was stirred, titanium tetraisopropoxide (284 g, 1 mole) was slowly added through an addition funnel. This mixture was heated and refluxed for 1 hour to produce a cloudy solution and, thereafter, an isopropanol/water mixture was distilled off under reduced pressure. A solution containing the product was cooled to a temperature lower than 70° C. and, while the solution was stirred, 380 g (corresponding to 3 mole as sodium hydroxide) of a 32 weight % aqueous solution of NaOH was added, and this was heated under reduced pressure to remove isopropanol/water to obtain a slightly cloudy pale yellow product. This was diluted with ethylene glycol to obtain an ethylene glycol solution at 1% by weight as a titanium element.

Example 1

As the titanium catalyst, the aforementioned lactic acid chelate-type titanium compound was used and, as the magnesium compound, a magnesium oxalate compound was used.

The phosphorus compound was synthesized as follows. An alcohol obtained from a palm oil (C14 alcohol accounts for 30% by weight, and C12 alcohol accounts for 70% by weight), bisphenol A, and triphenyl phosphite were reacted to obtain a mixture of the phosphorus compound and phenol. Further, phenol was removed to obtain a phosphorus compound of the following formula.

[Chemical formula 6]

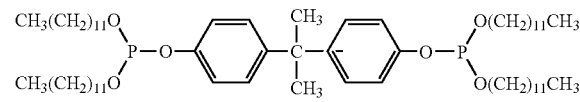

(Polymerization)

An esterification reaction was performed at a temperature of 250° C. using 166 parts by weight of terephthalic acid and 75 parts by weight of glycol, and the resulting product was transferred into a polymerization flask. The titanium compound (corresponding to titanium element 5 ppm) and the magnesium compound (corresponding to magnesium element 10 ppm) as a catalyst, and the phosphorus compound (corresponding to phosphorus element 6.5 ppm) (an addition amount is a metal element amount relative to a polyester weight) as a stabilizer were added, respectively, without mixing. A pressure was reduced from a normal pressure to 200 Pa over 1 hour, and a temperature was raised from 250° C. to 290° C. over 1.5 hours. A temperature in the flask at reaction completion is 290° C., and a final pressure is around 200 Pa. When a predetermined stirring torque was obtained, a polymer was taken out from the polymerization flask. An inherent viscosity of the resulting polyester was 0.65.

Examples 2 to 7

Using the same catalyst compound as that of Example 1 except that an addition amount of the catalyst was changed as shown in Table 1, and under the same condition, a polymer was polymerized.

Example 8

Using the same catalyst compound as that of Example 1 except that an addition amount of the catalyst was changed as shown in Table 1, and solvent blue 104 manufactured by Clariant was added at a 0.5 ppm equivalent at addition of the catalyst, and under the same condition, a polymer was polymerized.

Comparative Example 1

As a polymerization catalyst, in place of the titanium compound, $Sb_2O_3$ at an addition amount of 185 ppm in terms of an antimony element, the phosphorus compound of Example 1 at an addition amount of a phosphorus element of 16 ppm, the magnesium compound of Example 1 as an addition amount of 60 ppm in terms of a magnesium element and, further, potassium hydroxide at an addition amount of 4 ppm in terms of a potassium element were added, and polymerization was performed under the condition of Example 1.

Examples 9 to 12

Using the same catalyst compound as that of Example 8 except that an addition amount of the catalyst was changed as shown in Table 1, and under the same condition, a polymer was polymerized.

Example 13

Under the same condition as that of Example 1 except that, in place of magnesium oxalate, magnesium acetate at 40 ppm in terms of a magnesium atom, and 4,4'-isopropylidenediphenolalkyl (C12-C15) phosphite (Adekastab 1500, manufactured by ADEKA Corporation) at 10 ppm in terms of a phosphorus atom were added, a polymer was polymerized.

The resulting polymer was dried at 160° C. for 4 hours at a pressure of 1 Torr or lower, extruded through a T-die at an extrusion temperature of 280° C. using a monoaxial-type extruder, and cooled with a casting drum to obtain a sheet.

The sheet was stretched at 3.3 times at 95° C. in a longitudinal direction, stretched at 3.5 times at 100° C. in a width direction, and heat-treated at 220° C. for 3 seconds to obtain a biaxially stretched film. The resulting film had little defect, and was better.

Examples 14 to 16

Under the same condition as that of Example 13 except that an addition amount of the catalyst was changed as shown in Table 2, a polymer was polymerized to obtain a biaxially stretched film. The resulting film had little defect, and was better.

Example 17

Under the same condition as that of Example 16 except that, in place of the lactic acid chelate-type titanium compound, a citric acid chelate compound was added at 5 ppm in terms of a titanium atom, a polymer was polymerized to obtain a biaxially stretched film. The resulting film had little defect, and was better.

Example 18

A phosphorus compound 4 was synthesized as follows. A linear alcohol of a carbon number of 4 ($C_4H_9OH$), bisphenol A and triphenyl phosphite were reacted to obtain a mixture of a phosphorus compound 4 and phenol. Further, phenol was removed to obtain a phosphorus compound.

According to the same manner as that of Example 14 except that the phosphorus compound was used, a polymer and a film were obtained. The resulting film had little defect, and was better.

Example 19

A phosphorus compound 5 was synthesized as follows. A linear alcohol of a carbon number of 18 ($C_{18}H_{37}OH$), bisphenol A and triphenyl phosphite were reacted to obtain a mixture of a phosphorus compound 5 and phenol. Further, phenol was removed to obtain a phosphorus compound.

According to the same manner as that of Example 14 except that the phosphorus compound was obtained, a polymer and a film were obtained. The resulting film had little defect, and was better.

Example 20

A phosphorus compound 6 was synthesized as follows. A branched alcohol of a carbon number of 8 ($C_8H_{17}OH$), bisphenol A and triphenyl phosphite were reacted to obtain a mixture of a phosphorus compound 6 and phenol. Further, phenol was removed to obtain a phosphorus compound.

According to the same manner as that of Example 14 except that the phosphorus compound was used, a polymer and a film were obtained. The resulting film had little defect, and was better.

Comparative Example 2

Under the same condition as that of Example 13 except that, as the phosphorus compound, phosphoric acid was added at 16 ppm in terms of a phosphorus atom, a polymer was polymerized to obtain a biaxially stretched film. The resulting polymer was inferior in a b value in a color tone. Also in the biaxially stretched film, when an edge surface of a film roll was observed, yellowness was remarkable, and a color tone was inferior as compared with Examples 13 to 17.

Comparative Example 3

Under the same condition as that of Example 13 except that, as the phosphorus compound, trimethylphosphoric acid was added at 16 ppm in terms of a phosphorus atom, a polymer was polymerized to obtain a biaxially stretched film. The resulting polymer was inferior in a b value in a color tone. Also in the biaxially stretched film, when an edge surface of a film roll was observed, yellowness was remarkable, and a color tone was inferior.

Comparative Example 4

Under the same condition as that of Example 13 except that, as the phosphorus compound, ethyldiethyl phosphonoacetate was added at 16 ppm in terms of a phosphorus atom, a polymer was polymerized to obtain a biaxially stretched film. The resulting polymer was inferior in a b value in a color tone. Also in the biaxially stretched film, when an edge surface of a film roll was observed, yellowness was remarkable, and a color tone was inferior.

Example 21

A slurry consisting of 82.5 kg of high purity terephthalic acid (manufactured by Mitsui Chemicals, Inc.) and 35.4 kg of ethylene glycol (manufactured by NIPPON SHOKUBAI CO., LTD.) was sequentially supplied over 4 hours to an esterification reaction tank charged with about 100 kg of bis(hydroxyethyl) terephthalate in advance, and retained at a temperature of 250° C. and a pressure of $1.2 \times 10^5$ Pa. After completion of supply, an esterification reaction was performed over 1 hour, and 101.5 kg of this esterification reaction product was transferred to a polycondensation reaction tank.

Subsequently, a solution of 7.6 g (20 ppm in terms of a cobalt atom relative to a polymer) of cobalt acetate, and 12.0 g (15 ppm in terms of a magnesium atom relative to a polymer) of magnesium acetate in ethylene glycol, a citric acid chelate titanium compound at 5 ppm in terms of a titanium atom relative to a polymer, and 4,4'-isopropylidene-diphenol alkyl (C12-C15) phosphite (Adekastab 1500, manufactured by ADEKA Corporation) at 200 ppm (10 ppm in terms of a phosphorus atom) relative to a polymer were mixed in another mixing tank, the mixture was stirred at a normal temperature for 30 minutes, and the mixture was added to the polycondensation reaction tank. After 5 minutes, a slurry of a titanium oxide particle in ethylene glycol was added to 0.3% by weight in terms of a titanium oxide particle relative to a polymer. Thereafter, while a low-molecule polymer was stirred at 30 rpm, a temperature of the reaction system was gradually raised from 250° C. to 290° C., and a pressure was lowered to 40 Pa. A time for reaching a final temperature and a time for reaching a final pressure were both set to be 60 minutes. When a predetermined stirring torque was attained, the reaction system was purged with nitrogen, a pressure was returned to a normal pressure to stop the polycondensation reaction, and the reaction product was extruded into cold water in a strand manner, and immediately cut to obtain a pellet of a polymer. A time from initiation of pressure reduction to attainment of a prescribed stirring torque was 2 hours and 49 minutes.

In the resulting polymer, IV was 0.66, a carboxy terminal amount was 14.9 equivalent/ton, a color tone was L=76, a=−3.5, and b=−1.0, a DEG content was 0.9 wt %, a cyclic trimer content was 0.9 wt %, and an acetaldehyde content was 9 ppm, and a color tone was excellent. The polyester was excellent in thermal stability as $\Delta COOH_{290}=2.8$, and $\Delta b$ $value_{290}=1.1$.

In addition, this polyester was vacuum-dried at 150° C. for 12 hours, supplied to a spinning machine, melted with a melter, extruded from a spinning pack part, and taken off at a rate of 1000 m/min. In a melt spinning step, a sedimented material around a spinneret pore and increase in a filtration pressure at spinning were recognized in rare cases.

Example 22 to 29

According to the same manner as that of Example 21 except that addition amounts of the magnesium compound, the manganese compound, the calcium compound, and the cobalt compound were changed, respectively, as shown in Table 3, a polyester was polymerized, and melt-spun. In Examples 27 to 29, a color tone b value was slightly bad and, in other Examples, the resulting polymer was excellent in a color tone, and also excellent in thermal stability. In addition, a sedimented material around a spinneret pore and increase in a filtration pressure at spinning were recognized in rare cases.

Examples 30 to 35

According to the same manner as that of Example 21 except that addition amounts of the titanium compound and the magnesium compound were changed, respectively, as shown in Table 3, a polyester was polymerized, and melt-spun. In Example 35, a color tone and heat resistance were slightly bad, but this was a level which is not problematic at all for a product. In other Examples, both of a color tone and heat resistance were better. In addition, regarding a sedimented material around a spinneret pore and increase in a filtration pressure at spinning, in Example 33, contamination and yarn breakage were slightly seen, but this was a level which is not problematic for operation. In other Examples, a sedimented material around a spinneret pore, and increase in a filtration pressure at spinning were recognized in rare cases.

Examples 36 to 38

According to the same manner as that of Example 21 except that an addition amount of the phosphorus compound was changed in each case as shown in Table 3, a polyester was polymerized, and melt-spun. In Example 36, a color tone and heat resistance were slightly bad, but this was a level which is not problematic at all for a product. In other Examples, both of a color tone and heat resistance were better. In addition, regarding a sedimented material around a spinneret pore, and increase in a filtration pressure at spinning, in Example 36, contamination and yarn breakage were slightly seen, but this was a level which is not problematic at all for operation. In addition, a sedimented material around a spinneret pore, and increase in a filtration pressure at spinning were recognized in rare cases.

Examples 39 to 40

According to the same manner as that of Example 21 except that a time for mixing the titanium compound and the phosphorus compound was changed, a polyester was polymerized, and melt-spun. The resulting polymer was excellent in a color tone, and also excellent in thermal stability. In addition, a sedimented material around a spinneret pore, and increase in a filtration pressure at spinning were recognized in rare cases.

Example 41

According to the same manner as that of Example 21 except that the titanium compound and the phosphorus compound were not mixed in advance, a polyester was polymerized, and melt-spun. For adding the titanium compound and the phosphorus compound to a reaction system, the phosphorus compound was first added to a polycondensation reaction tank to which the esterification reaction product had been transferred, after 5 minutes, the magnesium compound was added and, after 5 minutes, the titanium compound was added. The resulting polymer was excellent in a color tone, and also excellent in thermal stability. In addition, a sedimented material around a spinneret pore, and increase in a filtration pressure at spinning were recognized in rare cases.

Example 42 to 44

According to the same manner as that of Example 21 except that the phosphorus compound was further added during after addition of the polycondensation catalyst, to attainment of a goal polymerization degree in polymerization from initiation of a polycondensation reaction in a reactor under reduced pressure, a polyester was polymerized, and melt-spun. For adding the phosphorus compound to the reaction system, at the time of 2 hours and 20 minutes from initiation of pressure reduction (at the time that a torque became 85% of a predetermined stirring torque), the phosphorus compound was charged into a container having a thickness of 0.2 mm and an internal volume of 500 cm$^3$ which had been made by injection-molding of a polyethylene terephthalate sheet, and this was added from an upper part of a reaction can.

The resulting polymer was excellent in a color tone, and also excellent in thermal stability. In addition, a sedimented material around a spinneret pore, and increase in a filtration pressure at spinning were recognized in rare cases.

Examples 45 to 46

According to the same manner as that of Example 21 except that, as the phosphorus compound, 4,4'-butylidene bis(3-methyl-6-t-butylphenyl-di-tridecyl)phosphite (Adekastab 260, manufactured by ADEKA Corporation), and 1,1,3-tris(2-methyl-4-di-tridecylphosphite-5-tert-butylphenyl) butane (Adekastab 522A, manufactured by ADEKA Corporation) were used, respectively, in place of 4,4'-isopropylidene-diphenolalkyl (C12-C15) phosphite as shown in Table 3, a polyester was polymerized, and melt-spun. The resulting polymer was excellent in a color tone, and also excellent in thermal stability. In addition, a sedimented material around a spinneret pore, and increase in a filtration pressure at spinning were recognized in rare cases.

Examples 47 to 49

According to the same manner as that of Example 21 except that, as the titanium compound, lactic acid chelate titanium, trimellitic acid chelate titanium and tetrabutoxytitanium were used, respectively, in place of the citric acid chelate titanium compound as shown in Table 3, a polyester was polymerized, and melt-spun. In Example 32, heat resistance was slightly bad, but this was a level which is not problematic at all for a product. In other Examples, both of a color tone and heat resistance were better. In addition, a sedimented material around a spinneret pore, and increase in a filtration pressure at spinning were recognized in rare cases.

Comparative Example 5

According to the same manner at that of Example 21 except that the phosphorus compound was not added, a polyester was polymerized and melt-spun. This polymer was a polymer which has a color tone strong in yellowness, contains a lot of DEG and acetoaldehyde, has great $\Delta COOH_{290}$ and $\Delta b$ value$_{290}$, and is inferior in heat resistance.

Comparative Examples 6 to 8

According to the same manner as that of Example 21 except that, as the phosphorus compound, a phosphoric acid-based compound shown in Table 5 was added in place of 4,4'-isopropylidene-diphenolalkyl (C12-C15) phosphite, a polyester was polymerized, and melt-spun.

In Comparative Examples 6 and 7, a torque did not reach a predetermined stirring torque. In addition, in Comparative Example 8, a time that a torque reached a predetermined stirring torque was considerably prolonged, resulting in a polymer inferior in a color tone. In addition, this polymer was a polymer which has greater $\Delta COOH_{290}$ and $\Delta b$ value$_{290}$, and is inferior in heat resistance.

Comparative Examples 9 to 11

According to the same manner as that of Example 21 except that, as the phosphorus compound, a phosphonic acid-based compound shown in Table 5 was added in place of 4,4'-isopropylidene-diphenolalkyl (C12-C15) phosphite, a polyester was polymerized, and melt-spun. In Comparative Examples 9 and 10, a torque did not reach a predetermined stirring torque. In addition, in Comparative Example 11, a time that a torque reached a predetermined stirring torque was considerably prolonged, resulting in a polymer inferior in a color tone. In addition, this polymer was a polymer which has greater $\Delta COOH_{290}$ and $\Delta b$ value$_{290}$, and is inferior in heat resistance.

Comparative Examples 12 to 14

According to the same manner as that of Example 21 except that, as the phosphorus compound, a phosphinic acid-based compound shown in Table 5 was added in place of 4,4'-isopropylidene-diphenolalkyl (C12-C15) phosphite, a polyester was polymerized, and melt-spun. In Comparative Examples 12 and 13, a torque did not reach a predetermined stirring torque. In addition, in Comparative Example 14, a time that a torque reached a predetermined stirring torque was considerably prolonged, resulting in a polymer inferior in a color tone. In addition, this polymer was a polymer which has greater. $\Delta COOH_{290}$ and $\Delta b$ value$_{290}$, and is inferior in heat resistance.

Comparative Examples 15 to 16

According to the same manner as that of Examples 21 except that, as the phosphorus compound, a phosphine oxide-based compound shown in Table 5 was added in place of 4,4'-isopropylidene-diphenolalkyl (C12-C15) phosphite, a polyester was polymerized. In both of Comparative Examples 15 and 16, a torque did not reach a predetermined stirring torque.

Comparative Examples 17 to 19

According to the same manner as that of Example 21 except that, as the phosphorus compound, a phosphorous acid-based compound shown in Table 5 was added in place of 4,4'-isopropylidene-diphenolalkyl (C12-C15) phosphite, a polyester was polymerized, and melt-spun. In any level, a time that a torque reached a predetermined stirring torque was considerably prolonged, resulting in a polymer inferior in a color tone. In addition, this was a polyester composition which has greater $\Delta COOH_{290}$ and $\Delta b$ value$_{290}$, and is inferior in thermal stability.

Comparative Examples 20 to 21

According to the same manner as that of Example 21 except that, as the phosphorus compound, a phosphonous acid-based compound shown in Table 5 was added in place of 4,4'-isopropylidene-diphenolalkyl (C12-C15) phosphite, a polyester was polymerized and melt-spun. In any level, a time that a torque reached a predetermined stirring torque was considerably prolonged, resulting in a polymer inferior in a color tone. In addition, this was a polyester composition which has greater $\Delta COOH_{290}$ and $\Delta b$ value$_{290}$, and is inferior in thermal stability.

Comparative Examples 22 to 23

According to the same manner as that of Example 21 except that, as the phosphorus compound, a phosphinous acid-based compound shown in Table 5 was added in place of 4,4'-isopropylidene-diphenolalkyl(C12-C15) phosphite, a polyester was polymerized, and melt-spun. In any level, a time that a torque reached a predetermined stirring torque was considerably prolonged, resulting in a polymer inferior in a color tone. In addition, this was a polyester composition which has greater $\Delta COOH_{290}$ and $\Delta b$ value$_{290}$, and is inferior in thermal stability.

Comparative Examples 24 to 25

According to the same manner as that of Example 21 except that, as the phosphorus compound, a phosphine-based compound shown in Table 5 was added in place of 4,4'-isopropylidene-diphenolalkyl (C12-C15) phosphite, a polyester was polymerized, and melt-spun. In any level, a time that a torque reached a predetermined stirring torque was considerably prolonged, resulting in a polymer inferior in a color tone. In addition, this was a polyester composition which has greater $\Delta COOH_{290}$ and $\Delta b$ value$_{290}$, and is inferior in thermal stability.

Comparative Example 26

According to the same manner as that of Example 21 except that antimony oxide was added in place of the titanium compound, a polyester was polymerized, and melt-spun. This polymer was a polymer in which a time that a torque reached a predetermined stirring torque, and a color tone and heat resistance of the polymer were better, but a sedimented material was seen around a spinneret pore at melt-spinning, and increase in a filtration pressure and yarn breakage were generated.

In the following Table, phosphorus compounds 1 to 6 are the following compounds

Phosphorus compound 1: 4,4'-isopropylidene-diphenolalkyl (C12-C15) phosphite (Adekastab 1500, manufactured by ADEKA Corporation)

Phosphorus compound 2: 4,4'-butylidene-bis(3-methyl-6-t-butylphenyl-di-tridecyl) phosphite (Adekastab 260, manufactured by ADEKA Corporation)

Phosphorus compound 3: 1,1,3-tris(2-methyl-4-di-tridecylphosphite-5-tert-butylphenyl)butane (Adekastab 522A, manufactured by ADEKA Corporation)

Phosphorus compound 4: phosphorus compound synthesized in Example 18

Phosphorus compound 5: phosphorus compound synthesized in Example 19

Phosphorus compound 6: phosphorus compound synthesized in Example 20

TABLE 1

| | Catalyst composition | | | | | Property of polyester resin | | | | | Sedimented material of melt spinning spinneret |
|---|---|---|---|---|---|---|---|---|---|---|---|
| | Mg/P (Mole ratio) | Ti (ppm) | Mg (ppm) | P (ppm) | (Ti + Mg)/P (Mole ratio) | IV | COOH amount (equivalent/t) | Color tone (L value/ b value) | Main chain cutting number | Polymerization time (h:min) | Melt specific resistance (Ω · cm) | |
| Example 1 | 2 | 5 | 10 | 6.5 | 2.5 | 0.667 | 16.7 | 70.8/3.1 | 2.0 | 2:42 | $2.9 \times 10^7$ | 8 |
| Example 2 | 1 | 5 | 10 | 13 | 1.3 | 0.655 | 20.2 | 71/2.0 | 1.2 | 2:50 | $2.6 \times 10^7$ | 6 |
| Example 3 | 2 | 5 | 20 | 13 | 2.2 | 0.658 | 16.5 | 70.5/3.5 | 1.3 | 2:45 | $1.1 \times 10^7$ | 5 |
| Example 4 | 1 | 4 | 10 | 13 | 1.2 | 0.657 | 17 | 70.0/4.2 | 1.1 | 3:00 | $2.4 \times 10^7$ | 4 |
| Example 5 | 1 | 7 | 10 | 13 | 1.3 | 0.66 | 18.2 | 70.3/5.0 | 1.6 | 2:35 | $2.7 \times 10^7$ | 6 |
| Example 6 | 63.7 | 2 | 100 | 2 | 64.4 | 0.656 | 20.1 | 69.5/5.1 | 2.2 | 3:00 | $0.8 \times 10^7$ | 4 |
| Example 7 | 0.1 | 20 | 5 | 60 | 0.3 | 0.661 | 15 | 69.2/4.9 | 2.0 | 2:45 | $3.2 \times 10^7$ | 5 |
| Example 8 | 2 | 5 | 10 | 6.5 | 2.5 | 0.658 | 17.5 | 67.5/2.5 | 2.1 | 2:40 | $2.9 \times 10^7$ | 4 |
| Example 9 | 0 | 5 | 0 | 10 | 0.3 | 0.664 | 16 | 65/6.1 | 4.2 | 2:55 | $20 \times 10^7$ | 5 |
| Example 10 | 5 | 3 | 20 | 5.2 | 5.3 | 0.505 | 30 | 63/12 | 6 | 3:20 | $1.5 \times 10^7$ | 8 |
| Example 11 | 5 | 8 | 20 | 5.2 | 6 | 0.667 | 18.5 | 64.0/9.0 | 5 | 2:25 | $1.2 \times 10^7$ | 7 |
| Example 12 | 17 | 5 | 70 | 5.2 | 18 | 0.667 | 22 | 62.5/13 | 8 | 2:50 | $0.7 \times 10^7$ | 8 |
| Comparative Example 1 | | Sb185 | | 60 | 16 | 0.665 | 21 | 66/7.0 | 4.7 | 2:30 | $17 \times 10^7$ | 40 |

TABLE 2

| | Titanium compound | | Phosphorus compound | | Magnesium compound | |
|---|---|---|---|---|---|---|
| | Type | Content (in term of Ti atom) ppm | Type | Content (in term of P atom ppm) | Type | Content |
| Example 13 | Lactic acid chelate | 5 | Phosphorus compound 1 | 10 | Magnesium acetate | 40 |
| Example 14 | Lactic acid chelate | 5 | Phosphorus compound 1 | 13 | Magnesium acetate | 40 |
| Example 15 | Lactic acid chelate | 5 | Phosphorus compound 1 | 20 | Magnesium acetate | 40 |
| Example 16 | Lactic acid chelate | 5 | Phosphorus compound 1 | 30 | Magnesium acetate | 40 |
| Example 17 | Citric acid chelate | 5 | Phosphorus compound 1 | 30 | Magnesium acetate | 40 |
| Example 18 | Lactic acid chelate | 5 | Phosphorus compound 4 | 13 | Magnesium acetate | 40 |
| Example 19 | Lactic acid chelate | 5 | Phosphorus compound 5 | 13 | Magnesium acetate | 40 |
| Example 20 | Lactic acid chelate | 5 | Phosphorus compound 6 | 13 | Magnesium acetate | 40 |
| Comparative Example 2 | Lactic acid chelate | 5 | Phosphoric acid | 16 | Magnesium acetate | 40 |
| Comparative Example 3 | Lactic acid chelate | 5 | Trimethylphosphoric acid | 16 | Magnesium acetate | 40 |
| Comparative Example 4 | Lactic acid chelate | 5 | Ethyldiethyl phosphonoacetate | 16 | Magnesium acetate | 40 |

TABLES 2-2

| | Polymer physical property | | | | | | | | |
|---|---|---|---|---|---|---|---|---|---|
| | Mole ratio | | | | | Polymerization time | Melt specific resistance ($\times 10^7$ Ω · cm) | L value | b value |
| | Mg/P | (Mg + Ti)/P | Ti/P | IV | COOH | | | | |
| Example 13 | 5.2 | 5.5 | 0.32 | 0.658 | 16.3 | 2:20 | 0.8 | 72.5 | 5.9 |
| Example 14 | 4.0 | 4.2 | 0.25 | 0.661 | 16.1 | 2:35 | 0.8 | 72.0 | 5.5 |
| Example 15 | 2.6 | 2.7 | 0.16 | 0.655 | 16.7 | 2:40 | 0.9 | 72.1 | 5.0 |
| Example 16 | 1.7 | 1.8 | 0.11 | 0.657 | 17.2 | 2:46 | 1.1 | 71.5 | 3.5 |
| Example 17 | 1.7 | 1.8 | 0.11 | 0.663 | 17.5 | 2:44 | 1.1 | 71.9 | 3.6 |
| Example 18 | 4.0 | 4.2 | 0.25 | 0.661 | 20.2 | 2:55 | 1.3 | 70.2 | 7.5 |
| Example 19 | 4.0 | 4.2 | 0.25 | 0.659 | 23.4 | 2:50 | 1.2 | 71.5 | 9.0 |
| Example 20 | 4.0 | 4.2 | 0.25 | 0.66 | 25.0 | 5:57 | 1.1 | 71.2 | 9.5 |
| Comparative Example 2 | 3.2 | 3.4 | 0.20 | 0.661 | 28.2 | 2:55 | 2.6 | 71.2 | 8.5 |
| Comparative Example 3 | 3.2 | 3.4 | 0.20 | 0.656 | 31.6 | 2:50 | 2.4 | 71.8 | 9.1 |
| Comparative Example 4 | 3.2 | 3.4 | 0.20 | 0.658 | 32.0 | 2:51 | 2.4 | 71.6 | 8.8 |

TABLE 3

| | Catalyst/additive | | | | | | | | | |
|---|---|---|---|---|---|---|---|---|---|---|
| | Titanium compound | | Phosphorus compound | | Magnesium compound | | Manganese compound | | Calcium compound | |
| | Type | Content (In term of atom) [ppm] | Type | Content (In term of atom) [ppm] | Type | Content (In term of atom) [ppm] | Type | Content (In term of atom) [ppm] | Type | Content (In term of atom) [ppm] |
| Example 21 | Citric acid chelate | 5 | Phosphorus compound 1 | 15 | Magnesium acetate | 15 | — | — | — | — |
| Example 22 | Citric acid chelate | 5 | Phosphorus compound 1 | 15 | — | — | Manganese acetate | 15 | — | — |
| Example 23 | Citric acid chelate | 5 | Phosphorus compound 1 | 15 | — | — | — | — | Calcium acetate | 15 |
| Example 24 | Citric acid chelate | 5 | Phosphorus compound 1 | 15 | Magnesium acetate | 5 | Manganese acetate | 5 | Calcium acetate | 5 |
| Example 25 | Citric acid chelate | 5 | Phosphorus compound 1 | 15 | Magnesium acetate | 15 | — | — | — | — |
| Example 26 | Citric acid chelate | 5 | Phosphorus compound 1 | 15 | Magnesium acetate | 5 | — | — | — | — |
| Example 27 | Citric acid chelate | 5 | Phosphorus compound 1 | 15 | Magnesium acetate | 3 | — | — | — | — |
| Example 28 | Citric acid chelate | 5 | Phosphorus compound 1 | 15 | Magnesium acetate | 1.5 | — | — | — | — |
| Example 29 | Citric acid chelate | 5 | Phosphorus compound 1 | 15 | — | — | — | — | — | — |
| Example 30 | Citric acid chelate | 3 | Phosphorus compound 1 | 15 | Magnesium acetate | 15 | — | — | — | — |
| Example 31 | Citric acid chelate | 1 | Phosphorus compound 1 | 15 | Magnesium acetate | 15 | — | — | — | — |
| Example 32 | Citric acid chelate | 1 | Phosphorus compound 1 | 15 | Magnesium acetate | 30 | — | — | — | — |
| Example 33 | Citric acid chelate | 1 | Phosphorus compound 1 | 15 | Magnesium acetate | 75 | — | — | — | — |
| Example 34 | Citric acid chelate | 10 | Phosphorus compound 1 | 15 | Magnesium acetate | 15 | — | — | — | — |
| Example 35 | Citric acid chelate | 20 | Phosphorus compound 1 | 15 | Magnesium acetate | 15 | — | — | — | — |
| Example 36 | Citric acid chelate | 5 | Phosphorus compound 1 | 3 | Magnesium acetate | 15 | — | — | — | — |
| Example 37 | Citric acid chelate | 5 | Phosphorus compound 1 | 75 | Magnesium acetate | 15 | — | — | — | — |
| Example 38 | Citric acid chelate | 5 | Phosphorus compound 1 | 100 | Magnesium acetate | 15 | — | — | — | — |
| Example 39 | Citric acid chelate | 5 | Phosphorus compound 1 | 15 | Magnesium acetate | 15 | — | — | — | — |
| Example 40 | Citric acid chelate | 5 | Phosphorus compound 1 | 15 | Magnesium acetate | 15 | — | — | — | — |
| Example 41 | Citric acid chelate | 5 | Phosphorus compound 1 | 15 | Magnesium acetate | 15 | — | — | — | — |
| Example 42 | Citric acid chelate | 5 | Phosphorus compound 1 | 15 + 10 | Magnesium acetate | 15 | — | — | — | — |
| Example 43 | Citric acid chelate | 5 | Phosphorus compound 1 | 15 + 35 | Magnesium acetate | 15 | — | — | — | — |
| Example 44 | Citric acid chelate | 5 | Phosphorus compound 1 | 15 + 85 | Magnesium acetate | 15 | — | — | — | — |
| Example 45 | Citric acid chelate | 5 | Phosphorus compound 2 | 15 | Magnesium acetate | 15 | — | — | — | — |
| Example 46 | Citric acid chelate | 5 | Phosphorus compound 3 | 15 | Magnesium acetate | 15 | — | — | — | — |
| Example 47 | Lactic acid chelate | 5 | Phosphorus compound 1 | 15 | Magnesium acetate | 15 | — | — | — | — |
| Example 48 | Trimellitic acid chelate | 5 | Phosphorus compound 1 | 15 | Magnesium acetate | 15 | — | — | — | — |
| Example 49 | TBT | 5 | Phosphorus compound 1 | 15 | Magnesium acetate | 15 | — | — | — | — |

TABLE 3-2

| | Catalyst/additive | | | | | | |
|---|---|---|---|---|---|---|---|
| | Cobalt compound | | Mole ratio of Ti/P | Content of Mg + Mn + Ca + Co | Mole ratio of (Mg + Mn + Ca + Co)/P | Order of catalyst addition | Polymerization time |
| | Type | Content (In term of atom) [ppm] | | | | | |
| Example 21 | Cobalt acetate | 20 | 0.22 | 35 | 2.0 | Mixing in advance 30 min. | 149 |
| Example 22 | Cobalt acetate | 20 | 0.22 | 35 | 1.3 | Mixing in advance 30 min. | 155 |
| Example 23 | Cobalt acetate | 20 | 0.22 | 35 | 1.5 | Mixing in advance 30 min. | 160 |
| Example 24 | Cobalt acetate | 20 | 0.22 | 35 | 1.6 | Mixing in advance 30 min. | 151 |
| Example 25 | — | — | 0.22 | 15 | 1.2 | Mixing in advance 30 min. | 172 |
| Example 26 | — | — | 0.22 | 5 | 0.4 | Mixing in advance 30 min. | 182 |
| Example 27 | — | — | 0.22 | 3 | 0.3 | Mixing in advance 30 min. | 187 |
| Example 28 | — | — | 0.22 | 1.5 | 0.1 | Mixing in advance 30 min. | 191 |
| Example 29 | — | — | 0.22 | 0 | — | Mixing in advance 30 min. | 205 |
| Example 30 | Cobalt acetate | 20 | 0.13 | 35 | 2.0 | Mixing in advance 30 min. | 158 |
| Example 31 | Cobalt acetate | 20 | 0.04 | 35 | 2.0 | Mixing in advance 30 min. | 171 |
| Example 32 | Cobalt acetate | 20 | 0.04 | 50 | 3.2 | Mixing in advance 30 min. | 180 |
| Example 33 | Cobalt acetate | 20 | 0.04 | 95 | 7.1 | Mixing in advance 30 min. | 199 |
| Example 34 | Cobalt acetate | 20 | 0.43 | 35 | 0.4 | Mixing in advance 30 min. | 143 |
| Example 35 | Cobalt acetate | 20 | 0.86 | 35 | 0.4 | Mixing in advance 30 min. | 138 |
| Example 36 | Cobalt acetate | 20 | 1.08 | 35 | 9.9 | Mixing in advance 30 min. | 145 |
| Example 37 | Cobalt acetate | 20 | 0.04 | 35 | 0.4 | Mixing in advance 30 min. | 187 |
| Example 38 | Cobalt acetate | 20 | 0.03 | 35 | 0.3 | Mixing in advance 30 min. | 193 |
| Example 39 | Cobalt acetate | 20 | 0.22 | 35 | 2.0 | Mixing in advance 5 min. | 151 |
| Example 40 | Cobalt acetate | 20 | 0.22 | 35 | 2.0 | Mixing in advance 240 min. | 152 |
| Example 41 | Cobalt acetate | 20 | 0.22 | 35 | 2.0 | No mixing in advance | 158 |
| Example 42 | Cobalt acetate | 20 | 0.13 | 35 | 1.2 | Mixing in advance 30 min. | 153 |
| Example 43 | Cobalt acetate | 20 | 0.07 | 35 | 0.6 | Mixing in advance 30 min. | 157 |
| Example 44 | Cobalt acetate | 20 | 0.03 | 35 | 0.3 | Mixing in advance 30 min. | 160 |
| Example 45 | Cobalt acetate | 20 | 0.22 | 35 | 2.0 | Mixing in advance 30 min. | 152 |
| Example 46 | Cobalt acetate | 20 | 0.22 | 35 | 2.0 | Mixing in advance 30 min. | 150 |
| Example 47 | Cobalt acetate | 20 | 0.22 | 35 | 2.0 | Mixing in advance 30 min. | 158 |
| Example 48 | Cobalt acetate | 20 | 0.22 | 35 | 2.0 | Mixing in advance 30 min. | 160 |
| Example 49 | Cobalt acetate | 20 | 0.22 | 35 | 2.0 | Mixing in advance 30 min. | 159 |

TABLE 4

| | Polymer physical property | | | | | | | | |
|---|---|---|---|---|---|---|---|---|---|
| | IV | Carboxyl terminal amount (equivalent/ton) | Color tone | | | DEG content [wt %] | Acetaldehyde content [ppm] | Δ $COOH_{290}$ | Δ $b\ value_{290}$ | Sedimented material around spinneret |
| | | | L value | a value | b value | | | | | |
| Example 21 | 0.66 | 14.9 | 76 | −3.5 | −1.0 | 0.9 | 9 | 2.8 | 1.1 | A |
| Example 22 | 0.66 | 15.3 | 74 | −3.7 | −0.3 | 1.0 | 10 | 2.8 | 1.1 | A |
| Example 23 | 0.66 | 15.2 | 74 | −3.6 | −0.4 | 1.0 | 10 | 2.8 | 1.1 | A |
| Example 24 | 0.66 | 15.2 | 75 | −3.5 | −0.6 | 1.0 | 10 | 2.8 | 1.1 | A |
| Example 25 | 0.66 | 15.2 | 81 | −2.0 | 1.8 | 1.0 | 8 | 2.6 | 1.0 | A |
| Example 26 | 0.66 | 15.2 | 81 | −2.0 | 2.5 | 1.0 | 8 | 2.5 | 0.9 | A |
| Example 27 | 0.66 | 16.0 | 82 | −2.1 | 2.8 | 1.1 | 11 | 2.5 | 0.9 | A |
| Example 28 | 0.66 | 16.5 | 82 | −2.1 | 3.2 | 1.1 | 11 | 2.4 | 0.9 | A |
| Example 29 | 0.66 | 15.8 | 75 | −3.3 | 4.5 | 1.0 | 10 | 2.5 | 0.8 | A |
| Example 30 | 0.66 | 16.6 | 75 | −3.3 | 3.3 | 1.1 | 11 | 2.5 | 0.8 | A |
| Example 31 | 0.66 | 17.0 | 76 | −3.2 | 3.0 | 1.1 | 12 | 2.4 | 0.8 | A |
| Example 32 | 0.66 | 16.0 | 74 | −3.0 | 0.2 | 1.2 | 13 | 2.9 | 1.0 | A |
| Example 33 | 0.66 | 20.3 | 74 | −3.5 | 2.9 | 1.3 | 13 | 3.3 | 1.3 | A-B |
| Example 34 | 0.66 | 16.7 | 73 | −3.5 | 1.9 | 1.1 | 11 | 3.0 | 1.3 | A |
| Example 35 | 0.66 | 20.1 | 73 | −3.7 | 4.0 | 1.2 | 11 | 3.8 | 2.0 | A |
| Example 36 | 0.66 | 26.5 | 72 | −3.5 | 3.9 | 1.3 | 13 | 5.9 | 3.3 | A |
| Example 37 | 0.66 | 14.5 | 76 | −3.3 | 2.3 | 1.2 | 10 | 2.4 | 0.9 | A |
| Example 38 | 0.66 | 14.7 | 73 | −3.3 | −0.3 | 1.0 | 10 | 2.8 | 1.1 | A |
| Example 39 | 0.66 | 14.9 | 73 | −3.5 | −0.6 | 1.0 | 10 | 2.8 | 1.1 | A |
| Example 40 | 0.66 | 15.2 | 73 | −3.5 | −0.8 | 0.9 | 9 | 2.8 | 1.1 | A |
| Example 41 | 0.66 | 15.5 | 74 | −3.3 | 0.0 | 1.1 | 10 | 3.0 | 1.1 | A |
| Example 42 | 0.66 | 14.4 | 74 | −3.1 | −1.3 | 0.9 | 9 | 2.0 | 0.8 | A |
| Example 43 | 0.66 | 14 | 75 | −3.3 | −1.9 | 0.9 | 9 | 1.8 | 0.7 | A |
| Example 44 | 0.66 | 13.5 | 76 | −3.3 | −1.9 | 0.9 | 9 | 1.6 | 0.7 | A |
| Example 45 | 0.66 | 15.1 | 74 | −3.1 | −0.8 | 0.9 | 9 | 2.7 | 1.0 | A |
| Example 46 | 0.66 | 15.1 | 74 | −3.1 | −1.0 | 0.9 | 9 | 2.7 | 1.0 | A |
| Example 47 | 0.66 | 15.1 | 74 | −3.5 | −1.0 | 0.9 | 9 | 2.8 | 1.1 | A |

TABLE 4-continued

| | | | Polymer physical property | | | | | | | |
|---|---|---|---|---|---|---|---|---|---|---|
| | IV | Carboxyl terminal amount (equivalent/ton) | Color tone L value | a value | b value | DEG content [wt %] | Acetaldehyde content [ppm] | Δ COOH$_{290}$ | Δ b value$_{290}$ | Sedimented material around spinneret |
| Example 48 | 0.66 | 16.4 | 73 | −3.1 | 0.1 | 1.0 | 11 | 2.8 | 1.2 | A |
| Example 49 | 0.66 | 20.1 | 73 | −3.1 | 2.1 | 1.3 | 12 | 3.6 | 2.6 | A |

TABLE 5

| | Catalyst/additive | | | | | | | |
|---|---|---|---|---|---|---|---|---|
| | Titanium compound | | Phosphorus compound | | Magnesium compound | | Manganese compound | |
| | Type | Content (In term of atom) [ppm] | | Type | Content (In term of atom) [ppm] | Type | Content (In term of atom) [ppm] | Type | Content (In term of atom) [ppm] |
| Comparative Example 5 | Citric acid chelate | 5 | — | — | — | Magnesium acetate | 15 | — | — |
| Comparative Example 6 | Citric acid chelate | 5 | Phosphoric acid-based | Phosphoric acid | 15 | Magnesium acetate | 15 | — | — |
| Comparative Example 7 | Citric acid chelate | 5 | | Triphenyl phosphate | 15 | Magnesium acetate | 15 | — | — |
| Comparative Example 8 | Citric acid chelate | 5 | | Sodium phosphate | 15 | Magnesium acetate | 15 | — | — |
| Comparative Example 9 | Citric acid chelate | 5 | Phosphonic acid-based | Phosphonic acid | 15 | Magnesium acetate | 15 | — | — |
| Comparative Example 10 | Citric acid chelate | 5 | | Phenylphosphonic acid | 15 | Magnesium acetate | 15 | — | — |
| Comparative Example 11 | Citric acid chelate | 5 | | Ethyl diethylphosphono-acetate | 15 | Magnesium acetate | 15 | — | — |
| Comparative Example 12 | Citric acid chelate | 5 | Phosphinic acid-based | Hypophosphorous acid | 15 | Magnesium acetate | 15 | — | — |
| Comparative Example 13 | Citric acid chelate | 5 | | Phenylphosphinic acid | 15 | Magnesium acetate | 15 | — | — |
| Comparative Example 14 | Citric acid chelate | 5 | | Sodium hypophosphite | 15 | Magnesium acetate | 15 | — | — |
| Comparative Example 15 | Citric acid chelate | 5 | Phosphine oxide-based | Trimethylphosphine oxide | 15 | Magnesium acetate | 15 | — | — |
| Comparative Example 16 | Citric acid chelate | 5 | | Triphenylphosphine oxide | 15 | Magnesium acetate | 15 | — | — |
| Comparative Example 17 | Citric acid chelate | 5 | Phosphorous acid | Phosphorous acid | 15 | Magnesium acetate | 15 | — | — |
| Comparative Example 18 | Citric acid chelate | 5 | | Triphenyl phosphite | 15 | Magnesium acetate | 15 | — | — |
| Comparative Example 19 | Citric acid chelate | 5 | | Sodium phosphite | 15 | Magnesium acetate | 15 | — | — |
| Comparative Example 20 | Citric acid chelate | 5 | Phosphonous acid-based | Phosphonous acid | 15 | Magnesium acetate | 15 | — | — |
| Comparative Example 21 | Citric acid chelate | 5 | | Phenylphosphonous acid | 15 | Magnesium acetate | 15 | — | — |
| Comparative Example 22 | Citric acid chelate | 5 | Phosphinous acid-based | Phosphinous acid | 15 | Magnesium acetate | 15 | — | — |
| Comparative Example 23 | Citric acid chelate | 5 | | Diphenylphosphinous acid | 15 | Magnesium acetate | 15 | — | — |
| Comparative Example 24 | Citric acid chelate | 5 | Phosphine-based | Phosphine | 15 | Magnesium acetate | 15 | — | — |
| Comparative Example 25 | Citric acid chelate | 5 | | Triphenylphosphine | 15 | Magnesium acetate | 15 | — | — |
| Comparative Example 26 | Antimony oxide | 250 | — | — | — | Magnesium acetate | 15 | — | — |

*1: A polymerization reaction did not progress until a prescribed inherent viscosity

TABLE 5-2

| | Catalyst/additive | | | | | | | |
|---|---|---|---|---|---|---|---|---|
| | Calcium compound | | Cobalt compound | | | | | |
| | Type | Content (In term of atom) [ppm] | Type | Content (In term of atom) [ppm] | Mole ratio of Ti/P | Content of Mg + Mn + Ca + Co | Mole ratio of (Mg + Mn + Ca + Co)/P | Order of catalyst addition | Polymerization time |
| Comparative Example 5 | — | — | Cobalt acetate | 20 | — | 35 | — | Mixing in advance 30 min. | 145 |
| Comparative Example 6 | — | — | Cobalt acetate | 20 | 0.22 | 35 | 2.0 | Mixing in advance 30 min. | *1 |
| Comparative Example 7 | — | — | Cobalt acetate | 20 | 0.22 | 35 | 2.0 | Mixing in advance 30 min. | *1 |
| Comparative Example 8 | — | — | Cobalt acetate | 20 | 0.22 | 35 | 2.0 | Mixing in advance 30 min. | 228 |
| Comparative Example 9 | — | — | Cobalt acetate | 20 | 0.22 | 35 | 2.0 | Mixing in advance 30 min. | *1 |
| Comparative Example 10 | — | — | Cobalt acetate | 20 | 0.22 | 35 | 2.0 | Mixing in advance 30 min. | *1 |
| Comparative Example 11 | — | — | Cobalt acetate | 20 | 0.22 | 35 | 2.0 | Mixing in advance 30 min. | 221 |
| Comparative Example 12 | — | — | Cobalt acetate | 20 | 0.22 | 35 | 2.0 | Mixing in advance 30 min. | *1 |
| Comparative Example 13 | — | — | Cobalt acetate | 20 | 0.22 | 35 | 2.0 | Mixing in advance 30 min. | *1 |
| Comparative Example 14 | — | — | Cobalt acetate | 20 | 0.22 | 35 | 2.0 | Mixing in advance 30 min. | 224 |
| Comparative Example 15 | — | — | Cobalt acetate | 20 | 0.22 | 35 | 2.0 | Mixing in advance 30 min. | *1 |
| Comparative Example 16 | — | — | Cobalt acetate | 20 | 0.22 | 35 | 2.0 | Mixing in advance 30 min. | *1 |
| Comparative Example 17 | — | — | Cobalt acetate | 20 | 0.22 | 35 | 2.0 | Mixing in advance 30 min. | 231 |
| Comparative Example 18 | — | — | Cobalt acetate | 20 | 0.22 | 35 | 2.0 | Mixing in advance 30 min. | 226 |
| Comparative Example 19 | — | — | Cobalt acetate | 20 | 0.22 | 35 | 2.0 | Mixing in advance 30 min. | 210 |
| Comparative Example 20 | — | — | Cobalt acetate | 20 | 0.22 | 35 | 2.0 | Mixing in advance 30 min. | 223 |
| Comparative Example 21 | — | — | Cobalt acetate | 20 | 0.22 | 35 | 2.0 | Mixing in advance 30 min. | 222 |
| Comparative Example 22 | — | — | Cobalt acetate | 20 | 0.22 | 35 | 2.0 | Mixing in advance 30 min. | 225 |
| Comparative Example 23 | — | — | Cobalt acetate | 20 | 0.22 | 35 | 2.0 | Mixing in advance 30 min. | 221 |
| Comparative Example 24 | — | — | Cobalt acetate | 20 | 0.22 | 35 | 2.0 | Mixing in advance 30 min. | 201 |
| Comparative Example 25 | — | — | Cobalt acetate | 20 | 0.22 | 35 | 2.0 | Mixing in advance 30 min. | 202 |
| Comparative Example 26 | — | — | Cobalt acetate | 20 | — | 35 | — | Mixing in advance 30 min. | 145 |

*1: A polymerization reaction did not progress until a prescribed inherent viscosity

TABLE 6

| | Polymer physical property | | | | | | | | |
|---|---|---|---|---|---|---|---|---|---|
| | IV | Carboxyl terminal amount (equivalent/ton) | Color tone L value | Color tone a value | Color tone b value | DEG content [wt %] | Acetaldehyde content [ppm] | Δ COOH$_{290}$ | Δ b value$_{290}$ | Sedimented material around spinneret |
| Comparative Example 5 | 0.66 | 31.0 | 79 | −3.3 | 6.8 | 1.6 | 16 | 8.9 | 5.2 | A |
| Comparative Example 6 | — | — | — | — | — | — | — | — | — | — |
| Comparative Example 7 | — | — | — | — | — | — | — | — | — | — |
| Comparative Example 8 | 0.66 | 27.1 | 74 | −3.1 | 6.1 | 1.5 | 14 | 8.0 | 5.0 | A |
| Comparative Example 9 | — | — | — | — | — | — | — | — | — | — |
| Comparative Example 10 | — | — | — | — | — | — | — | — | — | — |

TABLE 6-continued

| | | Polymer physical property | | | | | | | | |
|---|---|---|---|---|---|---|---|---|---|---|
| | | Carboxyl terminal amount | Color tone | | | DEG content | Acetaldehyde | Δ | Δ | Sedimented material around |
| | IV | (equivalent/ton) | L value | a value | b value | [wt %] | content [ppm] | COOH$_{290}$ | b value$_{290}$ | spinneret |
| Comparative Example 11 | 0.66 | 25.3 | 75 | −3.2 | 5.3 | 1.3 | 13 | 7.7 | 4.6 | A |
| Comparative Example 12 | — | — | — | — | — | — | — | — | — | — |
| Comparative Example 13 | — | — | — | — | — | — | — | — | — | — |
| Comparative Example 14 | 0.66 | 26.6 | 74 | −3.1 | 6.2 | 1.5 | 15 | 8.1 | 5.0 | A |
| Comparative Example 15 | — | — | — | — | — | — | — | — | — | — |
| Comparative Example 16 | — | — | — | — | — | — | — | — | — | — |
| Comparative Example 17 | 0.66 | 25.5 | 75 | −3.2 | 5.4 | 1.4 | 13 | 7.8 | 4.7 | A |
| Comparative Example 18 | 0.66 | 25.2 | 74 | −3.2 | 5.5 | 1.4 | 14 | 7.7 | 4.8 | A |
| Comparative Example 19 | 0.66 | 25.1 | 74 | −3.1 | 5.3 | 1.4 | 13 | 7.7 | 4.7 | A |
| Comparative Example 20 | 0.66 | 27.4 | 74 | −3.1 | 6.0 | 1.4 | 14 | 8.2 | 5.0 | A |
| Comparative Example 21 | 0.66 | 27.7 | 74 | −3.2 | 6.2 | 1.4 | 14 | 8.3 | 5.1 | A |
| Comparative Example 22 | 0.66 | 27.1 | 74 | −3.1 | 6.5 | 1.5 | 14 | 8.4 | 5.0 | A |
| Comparative Example 23 | 0.66 | 26.8 | 73 | −3.3 | 6.4 | 1.4 | 15 | 8.4 | 4.9 | A |
| Comparative Example 24 | 0.66 | 26.0 | 74 | −3.2 | 6.4 | 1.4 | 15 | 8.3 | 5.0 | A |
| Comparative Example 25 | 0.66 | 26.1 | 74 | −3.1 | 6.2 | 1.5 | 14 | 8.2 | 5.1 | A |
| Comparative Example 26 | 0.66 | 17.7 | 71 | −2.6 | 1.0 | 1.1 | 11 | 3.6 | 1.8 | B-C |

INDUSTRIAL APPLICABILITY

By the polymerization catalyst of the present invention, a polyester having remarkably improved color tone and heat resistance as compared with the previous product can be obtained. This polyester is suitable in a fiber, a film, a bottle and the like and, further, in production of a molded article, a problem such as deterioration in a color tone, spinneret contamination, increase in a filtration pressure, yarn breakage, film breakage and the like can be overcome.

The invention claimed is:

1. A method for producing a polyester comprising adding a phosphorus compound represented by the following formula (1) and at least one compound selected from the group consisting of a magnesium compound, a manganese compound, a calcium compound and a cobalt compound to a reaction system, in a method for obtaining a polyethylene terephthalate which comprises esterification or transesterification-reacting terephthalic acid or an ester-forming derivative thereof, and ethylene glycol or an ester-forming derivative thereof, and polycondensing this in the presence of a titanium-based polycondensation catalyst:

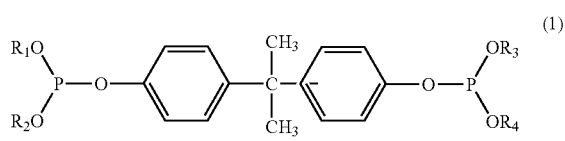

(1)

wherein, $R_1$, $R_2$, $R_3$, and $R_4$ are each a linear alkyl group, the carbon number of which is 8 to 16; a mole ratio (Mg+Mn+Ca+Co)/P of a sum of metal atoms in the magnesium compound, the manganese compound, the calcium compound and the cobalt compound, to a phosphorus atom in the phosphorus compound represented by the formula (1) is 0.1 to 10, an amount of the titanium-based polycondensation catalyst relative to a weight of the polyester is 3 to 15 ppm in terms of titanium atom, an amount in atom terms of magnesium relative to the polyester is 5 to 25 ppm, and a mole ratio of a sum of mole amounts of titanium, magnesium and phosphorus is 0.3 ≤ (Ti+Mg)/P ≤ 18 and the phosphorous compound and titanium-based polycondensation catalyst are added to the reaction system before initiation of the polycondensation reaction.

2. The method for producing a polyester according to claim 1, wherein, a mole ratio Ti/P of a titanium atom in the titanium-based polycondensation catalyst and a phosphorus atom in the phosphorus compound represented by the formula 1 is 0.01 to 1.5.

3. The method for producing a polyester according to claim 1, wherein, the titanium-based polycondensation catalyst is a titanium chelate complex comprising at least one selected from the group consisting of polyvalent carboxylic acid, hydroxycarboxylic acid and nitrogen-containing carboxylic acid.

4. The method for producing a polyester according to claim 1, wherein the titanium-based polycondensation catalyst and the phosphorus compound are mixed before addition to the reaction system.

* * * * *